United States Patent [19]

Kobayashi et al.

[11] Patent Number: 4,636,056
[45] Date of Patent: Jan. 13, 1987

[54] ELECTRICAL POWER SUPPLY CIRCUIT IN A CAMERA

[75] Inventors: Ryuichi Kobayashi; Akira Akashi; Masaharu Kawamura, all of Kanagawa, Japan

[73] Assignee: Canon Kabushiki Kaisha, Tokyo, Japan

[21] Appl. No.: 657,764

[22] Filed: Oct. 4, 1984

[30] Foreign Application Priority Data

Oct. 6, 1983 [JP] Japan .................................. 58-185893
Oct. 6, 1983 [JP] Japan .................................. 58-185894
Oct. 6, 1983 [JP] Japan .................................. 58-185895
Dec. 28, 1983 [JP] Japan .................................. 58-245901

[51] Int. Cl.⁴ ............................................. G03B 7/26
[52] U.S. Cl. .................................................. 354/484
[58] Field of Search ............... 354/412, 458, 484, 486, 354/460

[56] References Cited

U.S. PATENT DOCUMENTS

| 3,879,137 | 4/1975 | Sakazaki et al. | 354/484 X |
| 4,034,385 | 7/1977 | Arai | 354/460 |
| 4,253,750 | 3/1980 | Maida | 354/484 X |
| 4,269,496 | 5/1981 | Motoori et al. | 354/484 |
| 4,302,083 | 11/1981 | Kawamura et al. | 354/458 |
| 4,429,974 | 2/1984 | Suzuki et al. | 354/484 |

Primary Examiner—William B. Perkey
Attorney, Agent, or Firm—Toren, McGeady, Stanger, Goldberg & Kiel

[57] ABSTRACT

In a camera where the light metering circuit is supplied with electrical power by pushing the shutter release button to a first stroke, an electrical power supply circuit is constructed in such a way that when the time for which the shutter release button remains at the first stroke exceeds the prescribed period of time, the electrical power supply is stopped, and then when the release button is pushed down further to a second stroke, the electrical power supply starts again.

17 Claims, 9 Drawing Figures

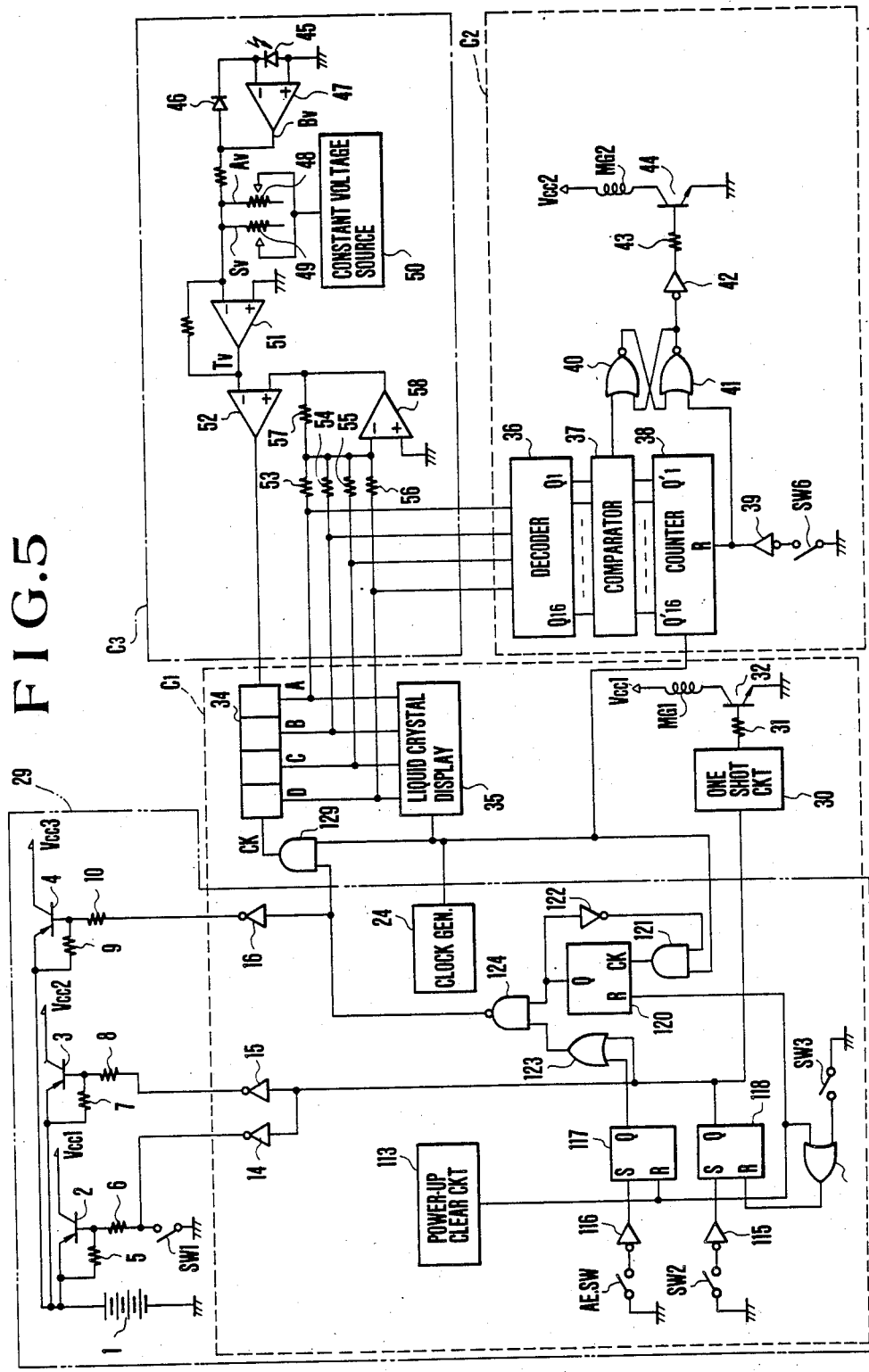
F I G. 5

ELECTRICAL POWER SUPPLY CIRCUIT IN A CAMERA

BACKGROUND OF THE INVENTION

1. Field of the Invention

This invention relates to improvements of the electrical power supply circuit in cameras of the type in which an electrical power supply to the various circuit portions is initiated by a first stroke of the shutter release button.

2. Description of the Prior Art

Most of the cameras generally have their power switches arranged to be closed in response to movement of the shutter release button. After the electrical power source has been thrown by a first stroke of the shutter release button, a releasing operation is initiated by a second stroke thereof, and the exposure is controlled automatically in accordance with the object brightness level sensed at the first stroke. In the application of such a camera for sports photography, for example, where as the subject is moving fast, shooting must take place so as to capitalize on the most opportune shutter chance, the photographers generally keep their shutter release buttons in the first stroke (just before the shutter is released), so that the time loss due to the pushing down of the release button across the first stroke is reduced as much as possible. However, this then gave rise to the problem of wasting electrical energy, because the battery must remain "on" as the photographer waits for his chance to take a picture.

SUMMARY OF THE INVENTION

A first object of the present invention is to eliminate the above-described problem and to provide an electrical power supply circuit for a camera capable of avoiding wasteful consumption of electrical power in a light metering circuit during the waiting time for an opportune shutter chance.

To achieve this, according to the invention, when the shutter release button is kept at the first stroke for a length of time longer than the prescribed time, the electrical power supply to the light metering circuit is automatically stopped.

A second object is, therefore, to provide an electrical power supply circuit of such a function.

Also, according to the invention, after the automatic stoppage of the electrical power supply to the light metering circuit, resulting from the excess of time in keeping the shutter release button in the first stroke position, when the shutter release button is then pushed down to a second stroke, the light metering circuit is supplied again with electrical power. Based on that output signal of the light metering circuit which is obtained with this or the second electrical power supply, an automatic exposure control is made.

A third object of the invention is, therefore, to provide an electrical power supply circuit for a camera with such a function.

Also, according to the invention, at the termination of a period of keeping the shutter release button at the first stroke, the electrical power supply to the light metering circuit is automatically stopped. Then, after another prescribed period of time, the electrical power supply to the light metering circuit starts again and is maintained for the first period. In this sense, the electrical power supply is recycled.

A fourth object is, therefore, to provide an electrical power supply circuit for a camera with such a function.

Another object of the invention is to provide for the camera capable of so-called AE lock shootings, an electrical power supply circuit operating in such a manner that as the AE locking operation is carried out, during a time when the light value is stored, the electrical power supply to the light metering circuit is stopped.

BRIEF DESCRIPTION OF THE DRAWINGS

FIG. 5 is a block diagram of a camera provided with an electrical power supply circuit operating in such a manner that when an AE locking is carried out to memorize the output of the light metering circuit, the electrical power supply to the light metering circuit is stopped.

DETAILED DESCRIPTION OF THE PREFERRED EMBODIMENTS

Figure 1:
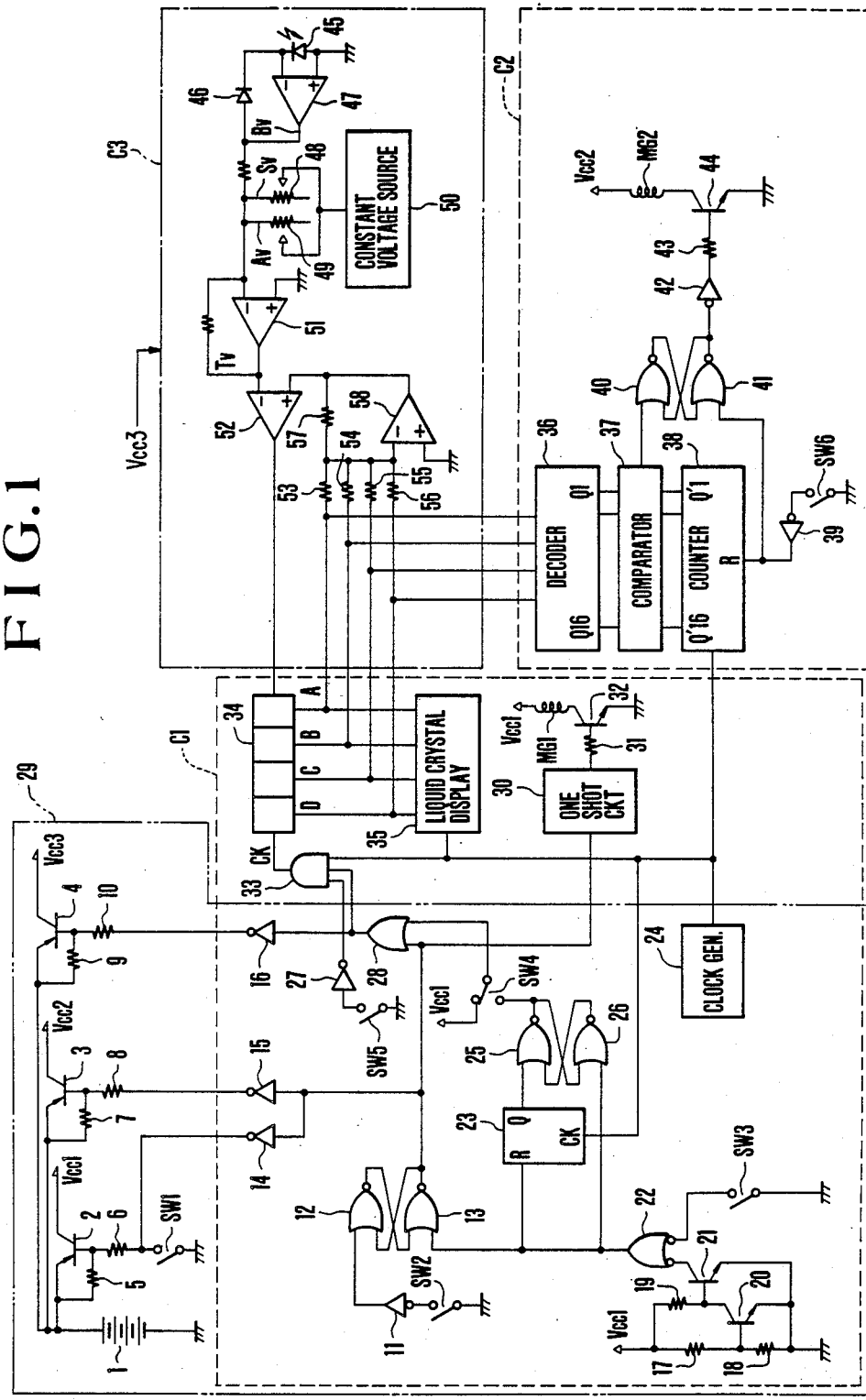
FIG. 1 is a block diagram of a camera provided with an electrical power supply circuit of such a function that when the shutter release button is kept at the first stroke for a longer period of time than that of the prescribed time, the electrical power supply to the light metering circuit is automatically stopped, and then when the shutter release button is further pushed down to a second stroke, electrical power is supplied once again to the light metering circuit to repeat light metering.

In FIG. 1 there is shown one embodiment of the present invention. An electrical power source or battery 1 has a positive terminal which is connected to three transistors 2, 3 and 4. When the transistors 2 to 4 are selectively turned on respective voltages Vcc1, Vcc2 and Vcc3 are produced. Resistors 5 to 10, a first switch SW1 arranged to be closed by a first stroke of the shutter release button, a second switch SW2 arranged to be closed by a second stroke of the button, an inverter 11, NOR gates 12 and 13 forming a flip-flop, open collector-type inverters 14, 15 and 16 for driving the transistors 2, 3 and 4 respectively, resistors 17, 18 and 19 which constitute a power-up clear circuit together with transistors 20 and 21, a switch SW3 arranged to turn on when the trailing curtain of the shutter has run down and to turn off when the film is advanced one frame, a NAND gate 22 for producing a clear signal, a counter 23 which is reset by the clear signal from the NAND gate 22 and after having counted a prescribed number of pulses produces an output signal of a high level, a clock pulse generator 24, NOR gates 25 and 26 which form another flip-flop and constitute a timer circuit together with the counter 23, a switch SW4 for selecting either one of the outputs of the timer circuit or the voltage Vcc1, arranged to be accessible to the user so that whether or not the timer circuit is rendered operative can be chosen, a switch SW5 arranged to turn off just before the quick return mirror moves upward, an inverter 27, and a NOR gate constitute an electrical power supply circuit 29 together with the parts 1 to 4.

Figure 2:
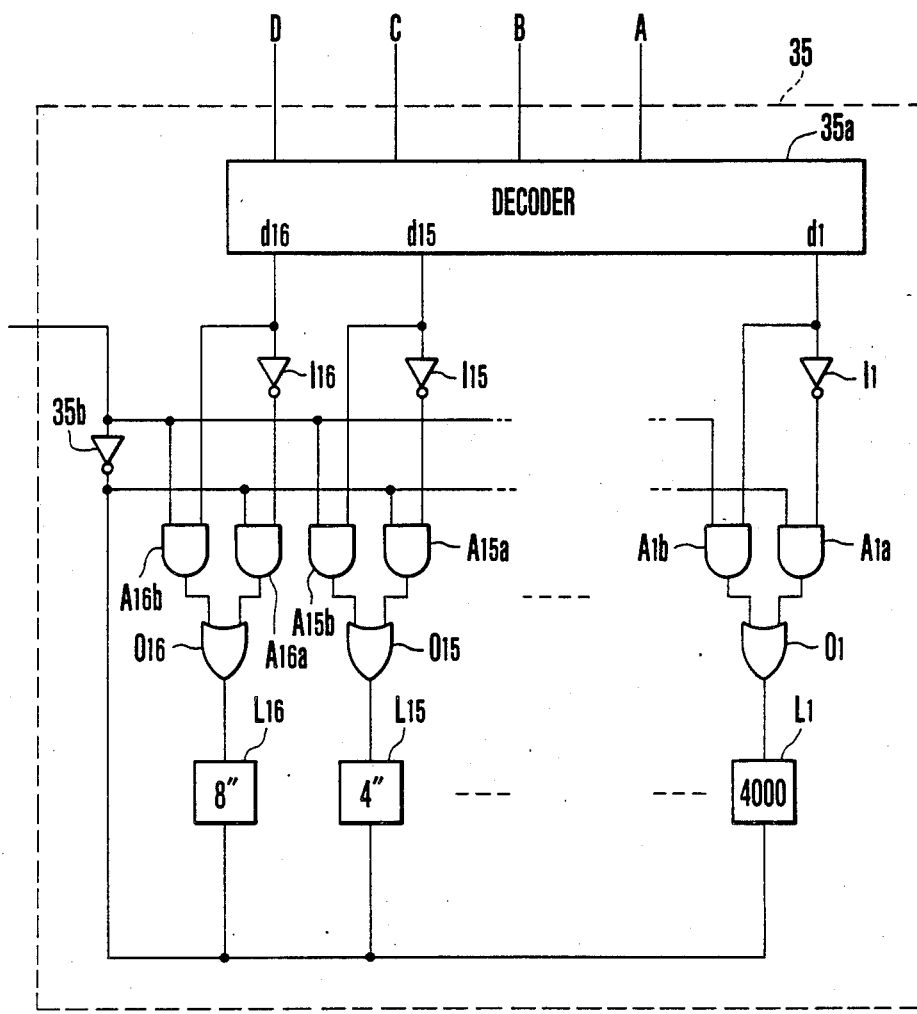
FIG. 2 is a block diagram of the liquid crystal display 35 shown in FIG. 1.

MG1 is an electromagnet for actuating a mechanical sequence of photographic operations. A drive circuit for said electromagnet MG1 comprises a one-shot circuit 30, a resistor 31 and a transistor 32. An UP/DOWN counter 34 has a clock input which is connected through an AND gate 33 to the generator 24 and is responsive to high and low levels of an output signal of a comparator (to be described later) for counting the clock pulses up and down respectively. The output of counter 34 is connected to the input of a liquid crystal display 35 (of which the details are shown in FIG. 2). Those of the above-described parts which are numbered from 11 to 35 and labelled SW2 to SW5 constitute a control circuit C1 for controlling the releasing operation and the like. As an electrical power source of said control circuit C1, the voltage Vcc1 is used.

Another control circuit C2 for controlling the operation of the trailing curtain of the shutter is constructed with a decoder 36, a comparator 37, a counter 38, an inverter 39, NOR gates 40 and 41 which form a flip-flop, a switch SW6 arranged to turn off at the start of movement of the leading curtain of the shutter and to turn on at a time during the film winding operation, an electromagnet MG2 for initiating a running down operation of the shutter trailing curtain, and a drive circuit for the electromagnet MG2 comprising an inverter 42, a resistor 43 and a transistor 44. As an electrical power source of the control circuit C2, the voltage Vcc2 is used.

A photosensitive element 45 is connected between two inputs of an operational amplifier 47 with a logarithmic compression diode 46 in the feedback network thereof. The output of the operational amplifier 47 represents an apex value of brightness information Bv. At variable resistors 48 and 49 there is generated film sensitivity information Sv and aperture information Av respectively by respective setting members (not shown). A constant voltage source 50 gives a constant voltage to sliders of the variable resistors 48 and 49. An operational amplifier 51 computes the brightness information Bv, the film sensitivity Sv and the aperture information Av based on the formula (Bv+Sv−Av) to produce an output representing shutter time information Tv. A comparator 52, an UP/DOWN counter 34, resistors 53 to 57 and an operational amplifier 58 constitute an A/D converter circuit. The resistors 53 to 56 connected at one of their ends to the respective output stages of the UP/DOWN counter 34 are valued two times as large as the successively preceding ones. Therefore, the output of the operational amplifier 58 is in the form of an analog voltage of which the value corresponds to the inverted amplification of the digital value of the outputs from the output stages A to D of the UP/DOWN counter 34. The photosensitive element 45 through the operational amplifier 58 constitute a light metering circuit C3 for evaluating the brightness of an object to be photographed. The voltage Vcc3 is used as an electrical power source of said light metering circuit C3.

FIG. 2 is an electrical circuit diagram of the liquid crystal display of FIG. 1. The liquid crystal display 35 is constructed with a decoder 35a having output lines d1 to d16, inverters 35b and I1 to I16′ AND gates A1a to A16a connected at one of their inputs to the output of the inverter 35b and at their other input to the respective outputs of the inverters I1 to I16′ AND gates A1b to A16b connected at one of their inputs to the output terminals d1 to d16 of the decoder 35a respectively and at their other inputs to the output of the clock pulse generator 24, OR gates O1 to O16′ and liquid crystal display elements L1 to L16 connected at one of their electrodes to the respective outputs of the OR gates O1 to O16 and at their other electrodes to the output of the inverter 35b.

The operation of the circuit of FIGS. 1 and 2 is as follows: Let us first consider a case when the switch SW4 is not set to select the output of the NOR gate 25 for employment in controlling the electrical power supply to the light metering circuit C3. In other words, a mode which operates in such a manner that as long as the shutter button is kept at the first stroke, the light metering circuit is always supplied with electrical power. Now assuming that one cycle of the film winding operation is completed, then when the shutter release button is pushed down to the first stroke, the switch SW1 is turned on, thereby the voltage at the base of the transistor 2 is dropped through the resistor 6 to a low level, rendering said transistor 2 conductive. Thus, the control circuit C1 is supplied with the voltage Vcc1. When the voltage Vcc1 is a zero volt, the transistors 20 and 21 are in a non-conductive state. But as the voltage Vcc1 rises, the voltage at the base of the transistor 21 also rises through the resistor 19. When said base voltage reaches 0.6 volts, the transistor 21 turns on, causing the NAND gate 22 to produce a clearing output signal. As the voltage Vcc1 rises further, when the voltage at the base of the transistor 20 reaches 0.6 volts, the transistor 21 is turned off, and thereby the output of the NAND gate 22 is changed to a low level. Thus the clearing signal is released.

Such change of the output of the NAND gate 22 to a low level causes the outputs of the NOR gates 13 and 26 to change to a low level, and the outputs of the NOR gates 12 and 25 to change to a high level. Also the counter 23 is reset. The signal of a high level from the output of the NOR gate 25 is applied through the switch SW4, OR gate 28, inverter 16 and resistor 10 to the transistor 4, thereby the transistor 4 is turned on to supply the voltage Vcc 3 to the light metering circuit C3. With the electrical power supplied to the light metering circuit C3, the photosensitive element 45 connected across the inputs of the operational amplifier 47 having an input resistor of a high impedance, and the diode 46 connected in the feedback network, cooperate with the operational amplifier 47 to produce an output in the form of a voltage proportional to the logarithm of the object brightness Bv. This brightness information Bv is computed with the film sensitivity information Sv and the aperture information Av from the variable resistors 48 and 49 by the operational amplifier 51 based on the formula: Bv+Sv−Av. The shutter time information Tv is derived in the form of a voltage of inverted polarity (for example, −9 volts for the apex value of 9 volts) at the output of the operational amplifier 51. This output is applied to the inversion input of the comparator 52, the non-inversion input of which is supplied with the output of the UP/DOWN counter in the form of an analog value of a negative sign corresponding to the digital value. Therefore, when the output of the operational amplifier 51, or the shutter time information Tv is higher or lower than the output of the operational amplifier 58, or the digital-to-analog converted value, the comparator 52 produces an output signal of a high or low level respectively which is then applied to the UP/DOWN counter 34. Thereby, the UP/DOWN counter 34, in response to a high level of the signal starts to count up, or in response to a low level of the signal starts to count down. The up-counting or down-counting of the UP/DOWN counter 34 is carried out in synchronism with the clock pulse applied thereto from the clock generator 24 through the AND gate 33. The analog-to-digital converting operation lasts until the clock input is inhibited by the AND gate 33. The digital value of the shutter time information Tv obtained by the A/D conversion is externally displayed by the liquid crystal display 35 (whose details will be described later).

Then, when the shutter release button is pushed down further to a second stroke, the switch SW2 is turned on, thereby a signal of a high level is applied through the inverter 11 to one of the inputs of the NOR gate 12. Therefore, the output of the NOR gate 12 changes to a low level, and the output of the NOR gate 13 changes to a high level. This signal of a high level is applied to the open collector-type inverters 14 and 15, the OR gate 28 and the one-shot circuit 30. In response to the signal of a high level, the inverter 14 changes its output to a low level so that even when the photographer removes his finger from the shutter release button at a time during exposure of the film, (the switch SW1 is opened), the electrical power supply is prevented from stopping. At the same time, the output of the inverter 15 is also pulled down to a low level, thereby the transistor 3 is turned on to apply the voltage Vcc2 as the electrical power source to the control circuit C2 for the trailing curtain of the shutter. Also applied to one of the inputs of the OR gate 28 is that signal of a high level from the NOR gate 13. At this time, however, the other input of the OR gate 28 is supplied with the signal of a high level from the NOR gate 25 through the switch SW4. Therefore, the output of the OR gate 28 does not change, remaining at a high level. Further, responsive to that signal of a high level, the one-shot circuit 30 produces an output pulse of a prescribed duration which is applied through the resistor 31 to the transistor 32. Then the transistor 32 is turned on for the prescribed length of time during which the electromagnet MG1 is energized.

By the energization of the electromagnet MG1, a mechanical sequence is initiated in closing down a diaphragm of the photographic lens and moving a reflex mirror upward. Just before the start of the upward movement of the mirror, the switch SW5 is turned off, causing the AND gate 33 to change its output to a low level. Thereby the supply of clock pulses to the UP/DOWN counter 34 is cut off. Thus, the resultant shutter time information Tv is memorized in said UP/DOWN counter 34. Also, this shutter time information Tv (digital value) is supplied from the output terminal A to D of the UP/DOWN counter 34 to the decoder 35a of the liquid crystal display device 35. Then, the decoder 35a selectively forces a corresponding one of its output lines d1 to d16 to a high level. For example, the first output line d1 is assumed to be selected. Then the AND gate A1b is gated on to pass the clock pulses from the generator 24 therethrough to the OR gate O1 and therefrom to one of the electrodes of the liquid crystal display element L1. For note, at this time, the resultant output of the NAD gate A1a is at a low level because the output of the inverter I1 is at a low level. The opposite electrode of that liquid crystal display element L1 is supplied with the inverted clock pulses (anti-phase) through the inverter 35b. Therefore, a voltage is applied across the two electrodes of the liquid crystal display element L1 so that the liquid crystal layer between these electrodes is rendered light permeable, presenting a display of 1/4000 sec. Conversely when the output line d1 is at a low level, the inverter I1 produces an output of a high level which is applied to one of the two inputs of the AND gate A1a. Therefore, the AND gate A1a passes the clock pulses of anti-phase from the inverter 35b therethrough to the OR gate O1 and therefrom to one of the electrodes of the liquid crystal display element L1. Since, at this time, the opposite electrode is supplied with the inverted clock pulses (anti-phase), no potential appears between the two electrodes, rendering the liquid crystal display element L1 impermeable to light. Thus, nothing is displayed at the location of the liquid crystal display element L1. In this sense, the sixteen liquid crystal display elements are selectively operated one at a time to display the computed exposure value or shutter time information Tv in the digital form at the liquid crystal display device 35.

As the sequence further advances, when the mirror has fully moved upward, the leading curtain of the shutter starts to run down. At this time, the count start switch SW6 is turned off, thereby a signal of a low level from the inverter 39 is applied to the counter 38. Therefore, the counter 38 is released from the resetting condition, starting to count clock pulses from the generator 24. Also the decoder 36 converts the shutter time information Tv stored on the UP/DOWN counter 34 by expansion to a real time value, producing an output representing that value at the output lines Q1 to Q16. When the output of the counter 38 becomes equal to this output, or when the duration of the shutter time stored is terminated, the comparator 37 produces an output signal of a high level. Responsive to this, the NOR gate 40 forming part of the flip-flop produces an output signal of a low level, and the NOR gate 41 produces an output signal of a high level. The output of the NOR gate 41 is applied through the inverter 42 and resistor 43 to the transistor 44, thereby the transistor 44 is turned off. Thus, the current supply to the electromagnet MG2 is cut off and the trailing curtain of the shutter starts to run down.

When the trailing curtain of the shutter has run down to the exposure aperture in its closed position, the switch SW3 is turned off, causing the NAND gate 22 to produce a clearing output signal. In response to this, the NOR gate 13 changes its output to a low level, thereby the transistors 2 and 3 are turned off. Thus, the electrical power supplies to the control circuit C1 and the light metering circuit C2 are stopped. At the same time, the transistor 4 also is turned off to stop the electrical power supply to the shutter control circuit C3. It is to be noted that by expanding the A/D converted shutter time information Tv to a real time, the adjustment of the shutter time is controlled.

Next an explanation is given of another case when the switch SW4 selects the NOR gate 25 for employment in controlling the electrical power supply to the light metering circuit C3. By the first stroke of the shutter release button, a similar operation to that described above starts. At the same time, the counter 23 which was cleared by the output of the NAND gate 22 starts to count. Now assuming that the shutter release button does not immediately go to the second stroke, (that is, it is held at the first stroke,) then, after a certain period of time, the counter 23 produces an output signal of a high level. In response to this, the NOR gates 25 and 26 forming the flip-flop change their outputs to low and high levels, respectively. The output of a low level from the NOR gate 25 is applied through the switch SW4 and OR gate 28 to the AND gate 33, thereby the supply of clock pulses to the UP/DOWN counter 34 is cut off. For note, the shutter time information Tv which has occurred at this time is memorized by the UP/DOWN counter 34. At the same time, the output of the NOR gate 25 is routed through the OR gate 28 to the inverter 16. Then, the inverter 16 produces an output signal of a high level. In response to this, the transistor 4 turns off, stopping the electrical power supply to the light metering circuit C3. Even after that, as long as the shutter release button is kept at the first stroke, the liquid crystal display device 35 continues being supplied with electrical power or the voltage Vcc1, presenting the display of the shutter time information Tv stored on the UP/DOWN counter 34 by the external liquid crystal display device 35. Since the amount of electrical power consumed by the liquid crystal display device 35 during this time is very small, it accounts for almost a negligible proportion of the whole consumption of electrical energy of the battery 1.

Upon further depression of the shutter release button from the first to the second stroke, the switch SW2 turns on, causing the NOR gate 13 to produce an output signal of a high level. By the inversion of the output of the NOR gate 13 to a high level, similarly as in the first case, the transistors 2 and 3 are turned on, supplying electrical power to the control circuit C1 and the shutter control circuit C2. Also the one-shot circuit 30 is actuated, and at the same time the output of the OR gate 28 changes its output to a high level, thereby the transistor 4 is turned on, supplying electrical power to the light metering circuit C3. Such change of the output of the OR gate 28 also causes the AND gate 33 to be gated on to pass the clock pulses from the generator 24 to the UP/DOWN counter 24. Thus, a second light metering followed by an A/D converting operation is initiated, and the shutter control is operated in a similar manner to that described in connection with the first case.

According to this embodiment, when the shutter release button is kept at the first stroke position for a length of time longer than that of the prescribed time, the electrical power supply to the light metering circuit is stopped. After the prescribed time, upon further depression to the second stroke a light metering operation is made to start again, thereby giving the advantage that much electrical power which would have otherwise been wasted can now be saved. Moreover, the exposure value, i.e. shutter time, can be computed based on the renewed object brightness information. Also, by using the liquid crystal display 35, the shutter time information stored in the UP/DOWN counter 34 is displayed, thus allowing the photographer to know what value the shutter time took just before the stoppage of the first electrical power supply, while waiting for a good shutter opportunity.

Figure 3:
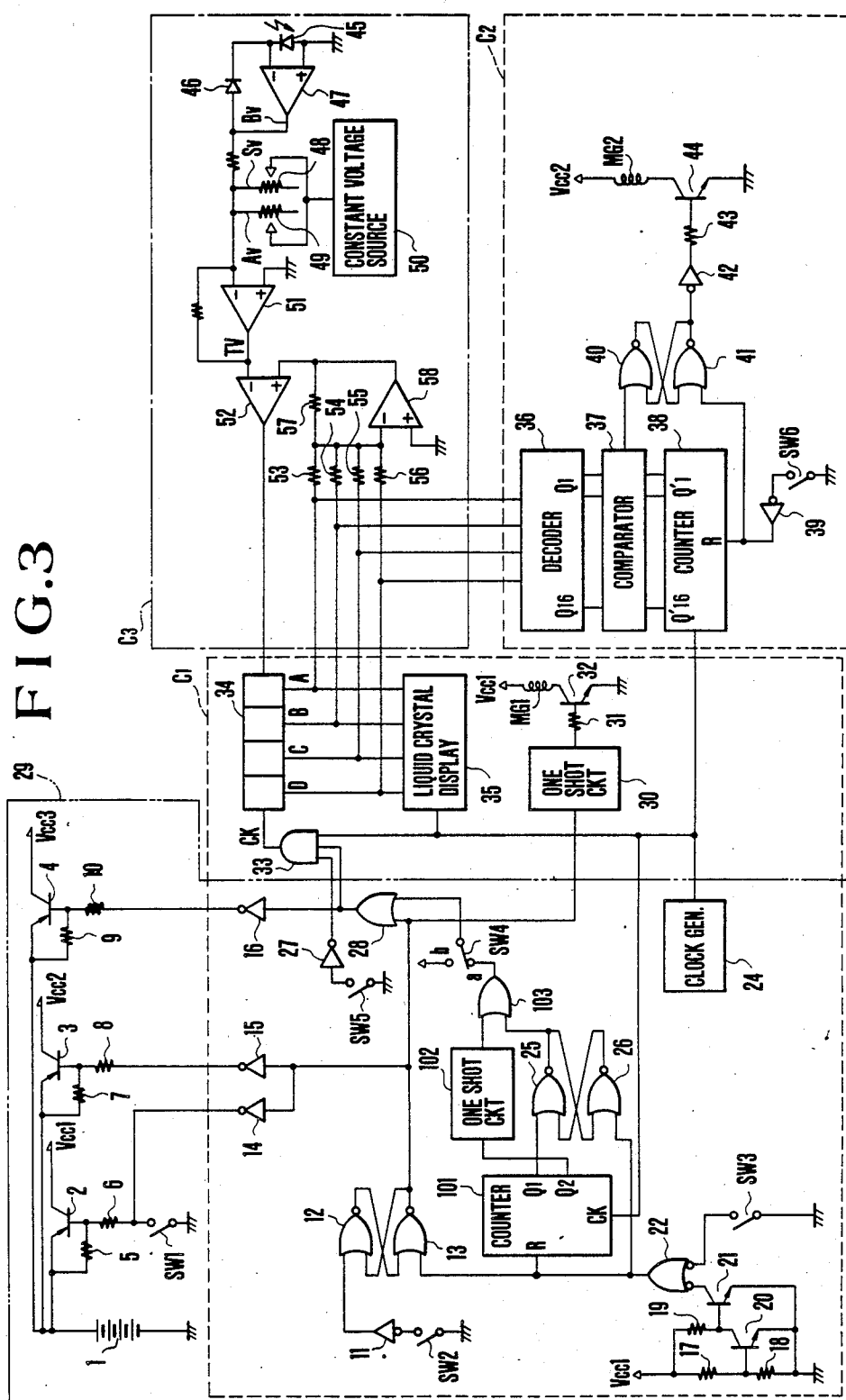
FIG. 3 is a block diagram of a camera provided with an electrical power supply circuit operating in such a way that when the shutter release button is kept at the first stroke for a period of time longer than that of the prescribed time, the electrical power supply to the light metering circuit is automatically stopped, and after that the electrical power supply to the light metering circuit is repeated in a prescribed period.

Another embodiment of the invention is next described in which when the amount of time for keeping the shutter release button at the first stroke exceeds the prescribed value, the electrical power supply to the light metering circuit is stopped, and as the first stroke position is retained, an electrical power supply of a short duration to the light metering circuit is recycled for a prescribed period of time, thereby making it possible to renew the light value by every prescribed interval, in reference to FIG. 3.

In FIG. 3 the elements having the same functions as those of the elements of the first embodiment shown in FIG. 1 are denoted by the same reference characters and therefore, their explanation is not necessary. The electrical power supply circuit 29 is obtained by replacing the counter 23 of FIG. 1 by a counter 101 similar thereto in that the same signal as that of the output terminal Q of the counter 23 is produced at a first output terminal Q1 but different therefrom in that there is provided an additional or second output terminal Q2 at which is produced an output signal that changes its level in a shorter period of time than that of the time counting period of the counter 23, and by further including a one-shot circuit 102. Each time the signal at the terminal Q2 rises from a low to a high level, the one-shot circuit 102 produces an output signal of a high level for a prescribed length of time. The pulse width of this output signal is adjusted to a value large enough for the light metering circuit to evaluate the object brightness and then for the A-to-D converting operation to be completed. An OR gate 103 has two inputs which are connected to the outputs of the one-shot circuit 102 and the flip-flop comprised of the NOR gates 25 and 26 and has an output which is connected to the fixed contact "a" of the switch SW4.

The operation of this embodiment of such a construction is described by using FIGS. 4(a) to 4(e). That which operates in a similar manner to that described in connection with the first embodiment of FIG. 1 is not neccessary to be explained.

Figure 4:
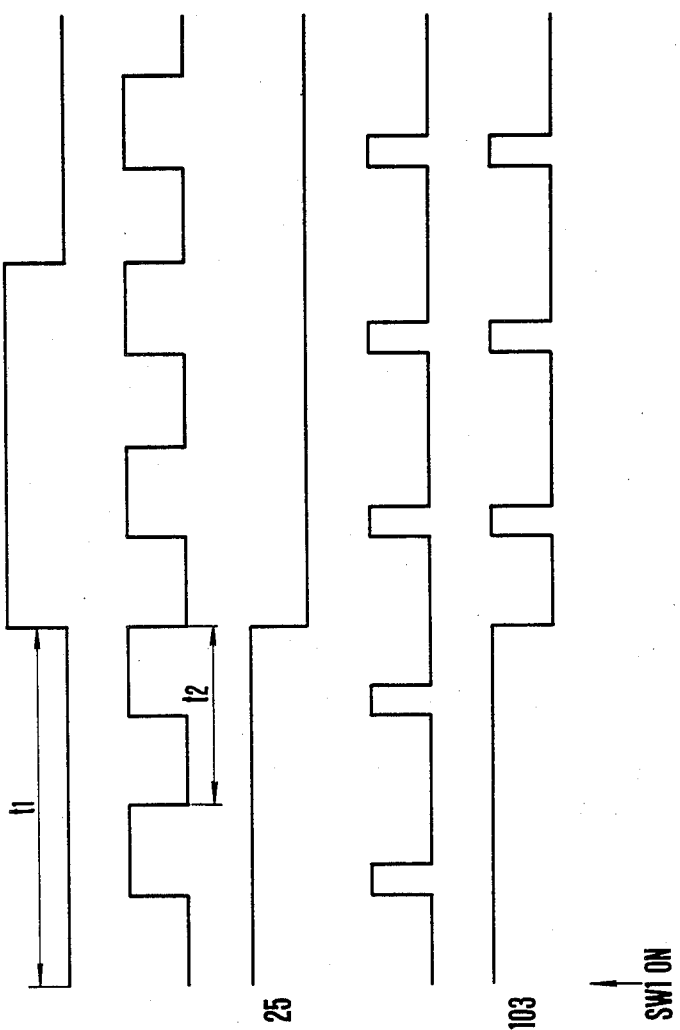
FIGS. 4(a) to 4(e) are pulse timing charts illustrating manners in which the electrical power supply circuit of FIG. 3 operates.

When the shutter release button is pushed down to the first stroke position, an electrical power supply to the light metering circuit is initiated and followed by an analog-to-digital conversion of the output of the light metering circuit, while the counter 101 is reset by the signal from the NOR gate 22 and starts to count pulses from the clock generator 24. Therefore, the counter 101 produces an output signal that takes a high level in a prescribed amount of time as shown in FIG. 4(b) at the terminal Q2 thereof. This output signal is applied to one of the inputs of the OR gate 103, the opposite input of which is connected to the output of the NOR gate 25. Until the output Q1 of the counter 101 reaches the "H" level, the output of the NOR gate 25 is at the "H" level as shown in FIG. 4(c). During the time interval which will terminate when the output Q1 of the counter 101 changes to the "H" level, therefore, the OR gate 103 is producing an output signal of a high level, causing the transistor 4 to be maintained as conductive through the inverter 16. Thus, the initiation of an electrical power supplying operation with the voltage Vcc3 to the light metering circuit C3 and a light metering operation are performed in sequence as has been described in connection with the embodiment of FIG. 1.

Then, after the elapse of a prescribed period of time t1 measured from the depression of the shutter release button to the first stroke, the OR gate 103 in response to a series of signals of the "H" level from the one-shot circuit 102 as shown in FIG. 4(d) produces a train of pulses as shown in FIG. 4(e). During a period in which the output of the OR gate 103 is at the "H" level, the AND gate 33 passes the clock pulses from the generator 24 therethrough to the UP/DOWN counter 34 in which the above analog-to-digital conversion is carried out. Simultaneously, the transistor 4 is maintained as conductive during that period by the output signal of the "H" level from the OR gate 103 through the OR gate 28, permitting electrical power such as Vcc3 to be supplied to the light metering circuit C3. It will be understood that it is during the prescribed period of time t1 from the actuation of a release to the first stroke, that the electrical power supply to the light metering cirucit C3 and the analog-to-digital conversion are continuously carried out, and, after the elapse of the period of time t1, that they are recycled at a prescribed period of time t2. Accordingly, if, despite the time interval from the actuation of a release to the expiration of the first stroke, the second stroke does not operate, the electrical power supply to the circuit C3 stops for the period of time t2 repeatedly, thus saving the wasteful consumption of electrical power by the light metering circuit which would otherwise result when the electrical power supply is continued while the shutter release button is kept at the first stroke, and allowing the newest brightness information to be processed to form a digital value in the counter at the period of time t2.

After that, when the release button is pushed to the second stroke, the switch SW2 is turned on, thereby the output of the inverter 11 is changed to a high level which in turn causes the outputs of the NOR gates 12 and 13 to change to the "L" and "H" levels, respectively. In response to the "H" signal from the NOR gate 13, the inverter 14 changes its output to the "L" level by which the electrical power supply is sustained even when the switch SW1 is turned off at a time during exposure of the film as the photographer's finger stops depressing the release button. At the same time, the inverter 15 changes its output to the "L" level, thereby the transistor 3 for the circuit 29 is turned on, initiating a supply of the voltage Vcc2 to the circuit C2. A subsequent procedure of the photographic sequence of the camera is similar to that described in connection with the embodiment of FIG. 1.

In this embodiment, the electrical power supply to the light metering circuit is automatically stopped at the prescribed period of time t1 measured from the depression of the shutter release button to the first stroke, and even after the stoppage, is recycled at a predetermined period of time t2 to renew the display of the computed exposure value, i.e., shutter time. Another feature is that after the shutter release button is further depressed to the second stroke, and just before the quick return mirror (not shown) of the camera starts to move upward, or until the switch SW5 moves from its ON to its OFF position, the light metering circuit is supplied with electrical power to obtain an effective light value. However, in application to such a system in which it takes an appreciably long time to derive a light value, for example, the output of the light sensor is processed by a so-called double integration type A/D converter to obtain digital information. Quite often, the quick return mirror changes its position at an intermediate time during the A/D converting operation of the output of the light sensor, and therefore, a high possibility exists for introducing an error into the light value. As a result, an improper exposure will be made. To avoid this, the photographic sequence may be otherwise programmed so that the start of an upward movement of the quick return mirror defers until the termination of the A/D converting operation. In this case, however, there is a possibility of increasing the time lag from the depression of the shutter release button to the a moment at which the shutter actually starts to open, making an exposure.

In this case, instead of carrying out a cycle of light metering operation which takes place after the shutter release button has been pushed down to the second stroke and before the switch SW5 changes its position, the latest light value obtained from the sequence of the recycled light metering operations with the prescribed period of time t2 may be factored into the exposure value, i.e., shutter time, permitting the depression of the shutter release button to the second stroke to be immediately followed by an initiation of an exposure of the film, as there is no need to perform an additional light metering operation. For this purpose, instead of using the signal of the switch SW5 for application to the input of the inverter 27, the output of the NOR gate 13 may be applied thereto.

Also, the embodiment of FIG. 1 may be similarly varied so that after the shutter release button has been kept at the first stroke position for a period of time longer than the prescribed amount of time, upon further depression from the first to the second stroke, as electrical power is no longer supplied to the light metering circuit due to the fact that there is no need for carrying out an additional light metering operation, the shutter can be immediately released.

Though the foregoing embodiments of FIGS. 1 and 3 have been described in connection with the analog computation of the exposure factors, a modification is possible such that the brightness information is converted to a digital value which is then computed with the digital values of Sv and Av by a digital computer circuit, and its output is applied to a latch circuit. In this case, the electrical power supply to the light metering circuit for the Bv and the analog-to-digital converting operation for the output of the light metering circuit are recycled at a prescribed period of time, and the output of the computer is inhibited from entering the latch circuit when the second stroke occurs.

Also in application to an analog exposure control system, there is only need to use a memory condenser whose input is connected to the output of the operational amplifier 51 through an analog switch. In each predescribed period of time, the light metering circuit and the analog switch are supplied with electrical power and a control signal respectively for a short time, thereby the latest Tv information is periodically transferred to the memory circuit. Then, at the time of depression of the release button to the second stroke, the subsequent transfer of the output of the light metering circuit to the memory circuit is prohibited from taking place.

As has been described above, according to the foregoing embodiment, if it is necessary to keep the shutter release button at the first stroke position for a period of time longer than that of the prescribed time, that fraction of the surplus time for which the light metering circuit is supplied with electrical power is reduced as much as possible to prevent premature consumption of electrical energy of the battery.

Still another embodiment of the invention applied to a camera having a so-called AE lock function including the memorization of a light value obtained from the light metering circuit and the control of the exposure in accordance with that memorized value whereby after the light value has been memorized, the electrical power supply to the light metering circuit is stopped so as to avoid the wasteful consumption of electrical power, is described below by reference to FIG. 5.

In the embodiment shown in FIG. 5, the elements having the same functions as those of the elements of the embodiment of FIG. 1 are denoted by the same reference characters and therefore, an explanation thereof is not necessary.

An electrical power supply circuit of FIG. 5 includes a power-up clear circuit 113 responsive to closure of the switch SW1 followed by production of the voltage Vcc1 for producing an output signal of a high level for a short time, an exposure lock switch AESW, an OR gate 114, inverters 115 and 116, RS flip-flops 117 and 118, a counter 120 receptive of a train of clock pulses from the clock generator 24 through an AND gate 121 and responsive to the attainment of the number of pulses counted to a prescribed value (in this instance, sixteen) for producing an output signal of a high level, an inverter 122, an OR gate 123, a NAND gate 124 and an AND gate 129.

The operation of the circuit of FIG. 5 is as follows: Let us first consider a case where the AE lock is not in use. When the shutter release button is depressed to the first stroke, the switch SW1 is turned on, thereby the voltage at the base of the transistor 2 is dropped through the resistor 6 to a low level. Therefore, the transistor 2 is rendered conductive to supply the voltage Vcc1 to the control circuit C1. Then, the known power-up clear circuit 113 produces an output signal of a high level for the prescribed amount of time which is applied to the RESET input R of the RS flip-flop 117, through the OR gate 114 to the RESET input R of the RS flip-flop 118, and to the RESET input of the counter 120. Thereby the outputs of the RS flip-flops 117 and 118 and the counter 120 each become of a low level.

Because the outputs of the RS flip-flops 117 and 118 are at a low level, the OR gate 123 produces an output signal of a low level which is applied to one of two inputs of the NAND gate 124. At this time, applied to the other input of the NAND gate 124 is the signal of a low level from the counter 120. Therefore, the NAND gate 124 produces an output signal of a high level which is applied to the inverter 112 and the AND gate 129. In response to the signal of a high level, the inverter 112 changes its output to a low level, thereby the transistor 4 is turned on, and the light metering circuit C3 is supplied with the voltage Vcc3. By the signal of a high level from the NAND gate 124, the AND gate 129 is gated on to pass a train of clock pulses from the clock generator 24 to the UP/DOWN counter 34. When the voltage Vcc3 is applied to the light metering circuit C3, the light metering circuit C3 operates in a similar manner to that described in connection with the foregoing embodiments. The obtained shutter time is displayed by the liquid crystal display device 35.

In the meantime, the signal of a low level from the counter 120 is applied through the inverter 122 as its inverted signal goes to one of the two inputs of the AND gate 121. Thereby the AND gate 121 is gated on to place the clock pulses applied on the opposite input thereof from the clock generator 24 onto its output which is connected to the counter 120. Then, the counter 120 starts to count the clock pulses from the AND gate 121.

Next, assuming that the camera is in the cocked position where the switch SW3 is ON, when the shutter release button is pushed down further to a second stroke, the switch SW2 is turned on, thereby the signal is applied through the inverter 115 to set the RS flip-flop 118. Therefore, the output of the RS flip-flop 118 changes to a high level. The signal of a high level from the RS flip-flop 118 is applied to the inverters 14 and 15 and OR gate 123.

Up to this point, the counter 120 has counted a prescribed number of pulses (in this instance, 16 pulses) and is producing an output signal of a high level which is applied through the inverter 122 as its inverted signal again to the AND gate 121. Thereby the AND gate 121 is gated off to prevent the clock pulses from entering the counter 120. Therefore, the output of the counter 120 is latched in a signal of a high level.

In response to the signal of a high level from the RS flip-flop 118, the OR gate 123 changes its output to a high level. This output is applied to one of the two inputs of the NAND gate 124, the other input of which is supplied with the signal of a high level from the counter 120. Therefore, the output of the NAND gate 124 changes to a low level, serving as a memory command signal. In response to the memory command signal of a low level from the NAND gate 124, the AND gate 129 gates off itself, preventing the clock pulses from entering the UP/DOWN counter 34. Shutter time information that takes place at that time is stored on the UP/DOWN counter 34. At the same time, the output of the NAND gate 124, or the memory command signal, is applied to the inverter 16, thereby the output of the inverter 16 is changed from a low level to a high level, causing the transistor 4 to turn off. Thus the electrical power supply to the light metering circuit C3 is cut off.

Also, the output of the RS flip-flop 118 is applied to the inverters 14 and 15, thereby the outputs of the inverters 14 and 15 are changed to a low level, causing the transistor 3 to turn on. Thus, the voltage Vcc2 is applied to the control circuit C2 for the trailing curtain of the shutter. At the same time, the signal of a high level from the RS flip-flop 118 is applied to the one-shot circuit 30, thereby the electromagnet MG1 is energized. A subsequent procedure is similar to that described in connection with the foregoing embodiments.

Let us next consider another case where a so-called AE lock shooting is made by manipulating the exposure lock switch AESW.

Now assuming that the exposure lock switch AESW is set after the switch SW1 has been turned on, that is, at a time during which the voltages Vcc1 and Vcc3 are supplied to the control circuit C1 and the light metering circuit C3 and the A/D converting operation, a signal of a high level from the inverter 116 is applied to the RS flip-flop 117, thereby the RS flip-flop 117 is set. Therefore, its output changes to a high level. This output is applied through the OR gate 123 to one of the inputs of the NAND gate 124. Then, when the signal at the output O of the counter 120 changes to a high level, the output of the NAND gate 124 changes from a high level to a low level, starting to serve as the memory command signal. In response to the memory command signal, the AND gate 129 prevents the clock pulses from entering the UP/DOWN counter 34. Thus, the concurrent shutter time information Tv is stored on the UP/DOWN counter 34. At the same time, the output of the NAND gate 124, or the memory command signal, is supplied to the inverter 16, thereby the output of the inverter 16 is changed to a high level, causing the transistor 4 to turn off. Thus, the light metering circuit C3 is cut off from the battery 1. A subsequent procedure is similar to that described above.

Alternatively, let us assume that the exposure lock switch AESW is set on before the shutter release button is pushed down to a first stroke. When the closure of the exposure lock switch AESW is followed by the first stroke of depression of the shutter release button, the switch SW1 is turned on. Then, the RS flip-flop 117 is first reset by the signal of a high level from the power-up clear circuit 113 and soon after regains the setting state. Also the counter 120 produces an output signal of a high level for a prescribed period of time measured from the closure of the switch SW1. Thereby, similarly to the above, the output of the NAND gate 124 is changed to a low level, serving as the memory command signal. In response to this, the AND gate 129 stops the clock pulses from the generator 24 from entering any further the UP/DOWN counter 34. At the same time, the output of the inverter 15 changes to a high level, causing the transistor 4 to turn off. Thus, the light metering circuit C3 is cut off from the battery 1.

It is to be noted that the counting time of the counter 120 is determined by taking into account the time necessary to perform the A/D conversion. Since, in this instance, the number of output bits of the UP/DOWN counter 34 is four, the counting time is taken at a value necessary to count 16 clock pulses. If the number of bits is five, the required number of pulses to be counted is 32.

According to this embodiment, the electrical power supply circuit is constructed such that when the exposure lock switch AESW is actuated at a time during the supply of the voltage Vcc3 to the light metering circuit C3, or when a supply of the voltage Vcc3 to the light metering circuit C3 starts under the condition that the exposure lock switch AESW is at the ON position, the NAND gate 124 produces a memory command signal by which the shutter time information Tv is stored on the UP/DOWN counter 34, and the switching transistor 4 between the battery 1 and the light metering circuit C3 is turned off, thereby preventing the wasteful consumption of electrical power during the time of exposure locking.

It is to be noted in this embodiment that the switch SW1 is not necessarily arranged to be responsive to the first stroke of the shutter release button, and may be in the form of a power switch manually operable independent of the shutter release button. Also the exposure lock switch AESW may be arranged otherwise so as to be impossible to actuate until at least one cycle of the A/D converting operation after the closure of the switch SW1 is completed. If so, the counter 120 is unnecessary.

It is also to be noted that the embodiments of the present invention have all been described, using the example of the so-called aperture priority camera, but it is of course possible to apply the invention to the shutter time priority and programmed exposure control cameras.

Also, the term "first stroke" as mentioned above means that the release button is first pushed down by one step. For another type of release button provided with a so-called touch switch, however, a touching action of the photographer's finger on the button should be taken as the first stroke, and a subsequent action of the first last pushing down of the button, as the second stroke.

What is claimed is:

1. A camera provided with an electrical power for supplying electrical power to a light metering circuit, comprising:

(A) a light metering circuit having a photosensitive element with an output and an amplifier for amplifying the output of said photosensitive element with the use of electrical power;
    (B) an electrical power source circuit responsive to a signal for supplying electrical power to said light metering circuit;
    (C) switching means having a first state and a second state and arranged to be operable manually; and
    (D) a control circuit responsive to detection of the fact that said switching means is in the second state for producing said signal, said control circuit producing said signal intermittently in response to detection of the fact that a prescribed period of time has passed with said switching means remaining in the second state.

2. A camera according to claim 1, wherein said switching means includes:

(A) a shutter release actuating member; and
    (B) a switch arranged to move from a first state to a second state in response to a first stroke of movement of said shutter release actuating member.

3. A camera according to claim 1, wherein said electrical power source circuit includes:

(A) an electrical power source portion for generating a prescribed output voltage; and
    (B) a transistor for switching the voltage generated from said electrical power source portion depending on said signal.

4. A camera according to claim 1, wherein said control circuit includes:

(A) detecting means for detecting when said switching means changes from the first state to the second state to produce said signal when said switching means is in the second state;
    (B) a timer responsive to that output of said detecting means which represents detection of the fact that said switching means has changed from the first state to the second state for counting a prescribed period of time, said timer producing a time counting completion signal upon termination of the duration of the period;
    (C) a counter for producing signals of a prescribed duration repeatedly in each prescribed period of time when said switching means is in the second state;
    (D) a control circuit operating in such a manner that until the time counting completion signal is produced from said timer said signal is produced, and in response to production of the time counting completion signal said signal is produced during the period when said counter is producing repetitive signals.

5. A camera provided with an electrical power supply circuit for supplying electrical power to a light metering circuit, comprising:

(a) a light metering circuit having a photosensitive element for forming an output and an amplifier for amplifying the output of said photosensitive element with electrical power;
    (b) an electrical power source circuit responsive to a control signal for supplying electrical power to said light metering circuit;
    (c) memory means for memorizing the output of said light metering circuit;
    (d) memory signal forming means for producing a memorizing signal for actuating said memory means to memorize the output of said light metering circuit;

(e) manually operable first switching means having a first state and a second state;

(f) manually operable second switching means having a first state and a second state for causing the camera to perform an exposure operation when in the second state; and (g) a control circuit responsive to detection of the fact that said first switching means is in the first state for producing said control signal and for stopping production of said control signal in response to said memorizing signal of said memory signal forming means.

6. A camera according to claim 5, further comprising:

(a) an exposure control circuit for controlling an exposure in accordance with the output of said light metering circuit memorized by said memory means.

7. A camera in which a power supply to a light metering circuit is performed in response to a manually operable first switch moving to an operating state and a exposure control action is performed by an exposure control circuit in response to a manually operable second switch moving to an operating state, said camera comprising:

(a) a memory circuit;

(b) a signal forming circuit responsive to a manual operation for forming a memorizing signal which is to have said memory circuit memorize a signal corresponding to an output of said light metering circuit;

(c) an electrical power supply circuit for effecting a power supply to said light metering circuit, said power supply circuit effecting the power supply when said manually operable first switch is in an operating state; and (d) an electrical power supply control circuit for prohibiting the power supply after an elapse of a prescribed period of time when a memorizing signal is formed by the signal forming circuit before said prescribed period of time elapses after said manually operable first switch moves to an operating state.

8. A camera comprising:

(a) a light metering circuit;

(b) manually operable switching means having a first state and a second state;

(c) an electrical power supply circuit for supplying power to said light metering circuit when said switching means is in the second state and for cutting the power supply when said switching means is in the first state;

(d) prohibiting means for forcibly prohibiting the power supply by said electrical power supply circuit when said switching means maintains the second state for more than a prescribed period of time even if the switching means still retains the second state after elapse of said prescribed period of time;

(e) manually operable second switching means having a first state and a second state;

(f) an exposure control circuit for initiating an exposure action in response to said manually operable second switching means moving to the second state; and (g) electrical power supply control means for causing the power supply to the light metering circuit effected in response to said manually operable second switching means moving to the second state even when the power supply is prohibited by the prohibiting means.

9. A camera according to claim 8, wherein said exposure control circuit has a memory circuit for memorizing a signal corresponding to an output of the light metering circuit in response to said manually operable switching means moving to the second state and a control portion for effecting an exposure control based on a memorized value in said memory circuit.

10. A camera according to claim 8, wherein said first switching means includes:

(A) a shutter release actuating member; and (B) a switch arranged to move from a first state to a second state in response to a first stroke of movement of said shutter release actuating member, and wherein said second switching means includes:

(C) a switch arranged to move from a first state to a second state in response to a second stroke of movement of said shutter release actuating member.

11. A camera comprising:

(a) a light metering circuit;

(b) manually operable switching means having a first state and a second state;

(c) an electrical power supply circuit for supplying power to said light metering circuit;

(d) a control circuit responsive to said manually operable switching means moving to the second state for having said electrical power supply circuit supply power to said light metering circuit continuously for a prescribed period of time and after elapse of said prescribed period of time having the power supply circuit supply power intermittently.

12. A camera comprising:

(a) a light metering circuit;

(b) manually operable switching means having a first state and a second state;

(c) an electrical power supply circuit supplying power to said light metering circuit;

(d) a control circuit responsive to said manually operable switching means moving to the second state for having said electrical power supply circuit supply the power to said light metering circuit intermittently;

(e) manually operable second switching means having a first state and a second state;

(f) an exposure control circuit for intitiating an exposure action in response to said manually operable second switching means moving to the second state; and (g) a second control circuit for causing the power supply to said light metering circuit in response to said manually operable second switching means moving to the second state independent of said intermittent power supply action by said control means.

13. A camera according to claim 12, wherein said exposure control circuit has a memory circuit for memorizing a signal coresponding to an output of the light metering circuit in response to said manually operable second switching means moving to the second state and a control portion for effecting an exposure control based on a memorized value in said memory circuit.

14. A camera in which power supply to a light metering circuit occurs in response to a manually operable first switch moving to an operating state and an exposure control action by an exposure control cuircuit occurs in response to a manually operable switch moving to an operating state, said camera comprising:
  (a) a memory circuit;
  (b) a signal forming circuit for manually forming a memorizing signal to have said memory circuit memorize a signal corresponding to an output of said light metering circuit;
  (c) an electrical power supply circuit for effecting a power supply to said light metering circuit when said manually operable first switch is in an operating state; and
  (d) a power supply control circuit for inhibiting the power supply of said electric power supply circuit subsequent to elapse of a prescribed period of time after said power supply is initiated in response to said manually operable first switch moving to the operating state when the memorizing signal is formed by the signal forming circuit before said manually operable first switch moves to an operating state, and for prohibiting the power supply by the power supply circuit after the prescribed period of time when after the manually operable first switch moves to an operating state the memorizing signal is formed from the signal forming circuit before said prescribed period of time has elapsed.

15. A camera in which a power supply is supplied to a light metering circuit in response to a manually operable first switch moving to an operating state and an exposure control action is performed by an exposure control circuit in response to a manually operable second switch moving to an operating state, said camera comprising:
  (a) memory circuit;
  (b) a signal forming circuit responsive to a manual operation for forming a memorizing signal which is to have said memory circuit memorize a signal corresponding to an output of said light metering circuit;
  (c) an electrical power supply circuit for effecting power supply to said light metering circuit when said manually operable first switch is in an operating state; and
  (d) an electrical power supply control circuit for inhibiting the power supply by said power supply circuit with an elapse of a prescribed period of time after said power supply is initiated in response to the manually operable first switch moving to the operating state when a memorizing signal is formed by said signal forming circuit before the manually operable first switch moves to the operating state.

16. A camera comprising:
  (a) a light metering circuit;
  (b) manually operable switching means having a first state and a second state;
  (c) an electrical power supply circuit for supplying power to said light metering circuit when said switching means is in the second state and for cutting the power supply when said switching means is in the first state; and
  (d) prohibiting means for forcibly prohibiting the power supply by said electrical power supply circuit when said switching means maintains the second state for more than a prescribed period of time even if the switching means still retains the second state after elapse of said prescribed period of time.

17. A camera according to claim 16, wherein said switching means includes:
  (A) a shutter release actuating member movable to a first position; and
  (B) a switch arranged to move from a first state to a second state in response to a first position in the movement of said shutter release actuating member.

* * * * *